(12) United States Patent
Xu et al.

(10) Patent No.: US 11,269,843 B2
(45) Date of Patent: Mar. 8, 2022

(54) OBJECT STORAGE METHOD AND OBJECT STORAGE GATEWAY

(71) Applicant: WANGSU SCIENCE & TECHNOLOGY CO., LTD., Shanghai (CN)

(72) Inventors: Wensong Xu, Shanghai (CN); Qiaoxing Huang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 261 days.

(21) Appl. No.: 16/463,114

(22) PCT Filed: Aug. 22, 2018

(86) PCT No.: PCT/CN2018/101748
§ 371 (c)(1),
(2) Date: May 22, 2019

(87) PCT Pub. No.: WO2020/024341
PCT Pub. Date: Feb. 6, 2020

(65) Prior Publication Data
US 2021/0109913 A1    Apr. 15, 2021

(30) Foreign Application Priority Data
Aug. 2, 2018    (CN) .......................... 201810872630.6

(51) Int. Cl.
*G06F 17/00*    (2019.01)
*G06F 16/22*    (2019.01)
(Continued)

(52) U.S. Cl.
CPC ........ *G06F 16/2282* (2019.01); *G06F 9/4411* (2013.01); *G06F 16/24573* (2019.01); *G06F 16/289* (2019.01)

(58) Field of Classification Search
CPC .......... G06F 16/2282; G06F 16/24573; G06F 16/289; G06F 9/4411; G06F 16/278; G06F 17/00
See application file for complete search history.

(56) References Cited

U.S. PATENT DOCUMENTS 10,796,356 B2 * 10/2020 Anand ..................... G06F 16/00
2014/0109176 A1 * 4/2014 Barton .................. G06F 3/0481
726/1
(Continued)

FOREIGN PATENT DOCUMENTS

CN    103336811 A    10/2012
CN    103502953 A    1/2014
(Continued)

OTHER PUBLICATIONS

Hung-Ming Chen, Ci-Jie Li, and Bi-Shun Ke. Designing a Simple Storage Services (S3) Compatible System Based on Ceph Software-Defined Storage System. In Proceedings of the 2017 2nd International Conference on Multimedia Systems and Signal Processing, pp. 6-10, Association for Computing Machinery, Aug. (Year: 2017).*
(Continued)

*Primary Examiner* — Greta L Robinson

(57) ABSTRACT

An object storage method includes: receiving an operation instruction, towards a target object, transmitted by a client terminal of a user; in response to the operation instruction, determining a storage area corresponding to the target object, where the storage area is located in a key-value storage database, the storage area is associated with a data table in the key-value storage database, and storage information of objects in the storage area is recorded in the data table; and processing the target object in the storage area of the key-value storage database according to the operation instruction, and modifying storage information of the target (Continued)

object in the data table according to a result of processing the target object.

16 Claims, 4 Drawing Sheets

(51) Int. Cl.
    *G06F 16/2457*     (2019.01)
    *G06F 16/28*     (2019.01)
    *G06F 9/4401*     (2018.01)

(56) References Cited

U.S. PATENT DOCUMENTS

| | | | |
|---|---|---|---|
| 2015/0302037 A1 | 10/2015 | Jackson et al. | |
| 2015/0324281 A1 | 11/2015 | Takefman et al. | |
| 2016/0179836 A1* | 6/2016 | Guo | G06F 16/162 |
| | | | 707/692 |
| 2016/0350392 A1* | 12/2016 | Rice | G06F 16/27 |
| 2017/0277477 A1* | 9/2017 | Xi | G06F 16/2282 |
| 2019/0392047 A1* | 12/2019 | Sorenson, III | G06F 16/2255 |

FOREIGN PATENT DOCUMENTS

| | | |
|---|---|---|
| CN | 103530111 A | 1/2014 |
| CN | 106649708 A | 5/2017 |
| CN | 107832455 A | 3/2018 |
| CN | 107911461 A | 4/2018 |
| CN | 107977396 A | 5/2018 |
| EP | 3260971 A1 | 12/2017 |

OTHER PUBLICATIONS

The European Patent Office (EPO) The Extended European Search Report for 18899023.8, dated Jun. 26, 2020 13 Pages.
The China National Intelleectual Property Administration (CNIPA) The China Search Report for 201810872630.6, dated Aug. 16, 2019 4 Pages.
The World Intellectual Property Organization (WIPO) International Search Report and Written Opinion for PCT/CN2018/101748 dated Apr. 8, 2019 8 Pages.

* cited by examiner

OBJECT STORAGE METHOD AND OBJECT STORAGE GATEWAY

CROSS-REFERENCE TO RELATED APPLICATIONS

This application is a national phase entry under 35 U.S.C § 371 of International Application No. PCT/CN2018/101748 filed on Aug. 22, 2018, which claims priority of Chinese Patent Application No. 2018108726306, filed with the State Intellectual Property Office of P. R. China on Aug. 2, 2018, the entire contents of all of which are incorporated herein by reference.

FIELD OF DISCLOSURE

The present disclosure generally relates to the field of Internet technology and, more particularly, relates to an object storage method and object storage gateway.

BACKGROUND

In current Ceph system, data may be stored in an Object-based Storage Device (OSD) through an object storage approach. Referring to FIG. 1, the current Ceph system may store a user's object through a RadosGW (Reliable Autonomic Distributed Object Store GateWay). In the existing Ceph system, objects stored in an OSD are classified according to the bucket, where each bucket may be associated with a bucket index object. Objects contained in a bucket may each have its own record in a bucket index object. In this way, after receiving a storage instruction towards a target object issued by a user, the RadosGW may query the bucket index object where the target object is located by using an object mapping (oMap) mode. Afterwards, an OSD where the bucket index object is located may be determined by using a crush algorithm, and the user's storage request may be dispatched to the corresponding OSD through the Rados client terminal. In the OSD, the user's storage request may be processed in serial, so that the target object may be written into the OSD, and the storage record of the target object may be added to the corresponding bucket index object.

However, the existing Ceph system has the following drawbacks: a bucket index object contains the storage records of objects in the bucket. Once the bucket index object acts abnormally, all objects contained in the bucket index object will be affected. Since the stability of a bucket index object itself is not high enough, the existing Ceph system is not stable enough for object storage.

BRIEF SUMMARY OF THE DISCLOSURE

The objective of the present disclosure is to provide an object storage method and object storage gateway, which may improve the stability of systems in storing objects.

To achieve the above objective, in one aspect, the present disclosure provides an object storage method. The method is applied to an object storage gateway, and the method includes: receiving an operation instruction, towards a target object, transmitted by a client terminal of a user; in response to the operation instruction, determining a storage area corresponding to the target object, where the storage area is located in a key-value storage database, the storage area is associated with a data table in the key-value storage database, and storage information of objects in the storage area is recorded in the data table; and processing the target object in the storage area of the key-value storage database according to the operation instruction, and modifying storage information of the target object in the data table according to a result of processing the target object.

To achieve the above objective, in another aspect, the present disclosure provides an object storage gateway. The object storage gateway establishes a connection with a key-value storage database, and the object storage gateway includes: an instruction receiving unit that is configured to receive an operation instruction, towards a target object, transmitted by a client terminal of a user; a bucket index unit that is configured to determine a storage area corresponding to the target object in response to the operation instruction, where the storage area is located in a key-value storage database, the storage area is associated with a data table in the key-value storage database, and storage information of objects in the storage area is recorded in the data table; and an instruction execution unit that is configured to process the target object in the storage area of the key-value storage database according to the operation instruction, and modify storage information of the target object in the data table according to a result of processing the target object.

As can be seen from the above, the technical solutions provided by the present disclosure may improve the existing RadosGW by adding a key-value storage database-based object storage mode in the RadosGW. Specifically, the object storage gateway may establish a connection with the key-value storage database, and index information of all of the users' objects may be stored in the key-value storage database. At the same time, the objects in the key-value storage database may be divided according to the storage area. Each storage area may be associated with a data table in the key-value storage database, where the data table may record the storage information of each object in the storage area. In this way, when the RadosGW receives an operation instruction towards a target object issued by a user, the RadosGW may first determine the storage area corresponding to the target object. Afterwards, through the connection established with the key-value storage database, the RadosGW may process the target object in the corresponding storage area of the key-value storage database. After processing, the storage information of the target object in the data table may be modified according to the result of processing the target object. As can be seen, the technical solutions provided by the present disclosure no longer associate a bucket with a bucket index object, but rather associate a bucket with a data table in the key-value storage database. Due to the relatively better stability of a key-value storage database, the stability of data storage may be thus improved. In addition, when modifying the storage information of an object in the data table, the storage information of other objects may be ascertained to be not affected, thereby further affirming the stability of data storage.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the present disclosure will be made in detail hereinafter with reference to the accompanying drawings.

Embodiment 1

Figure 1:
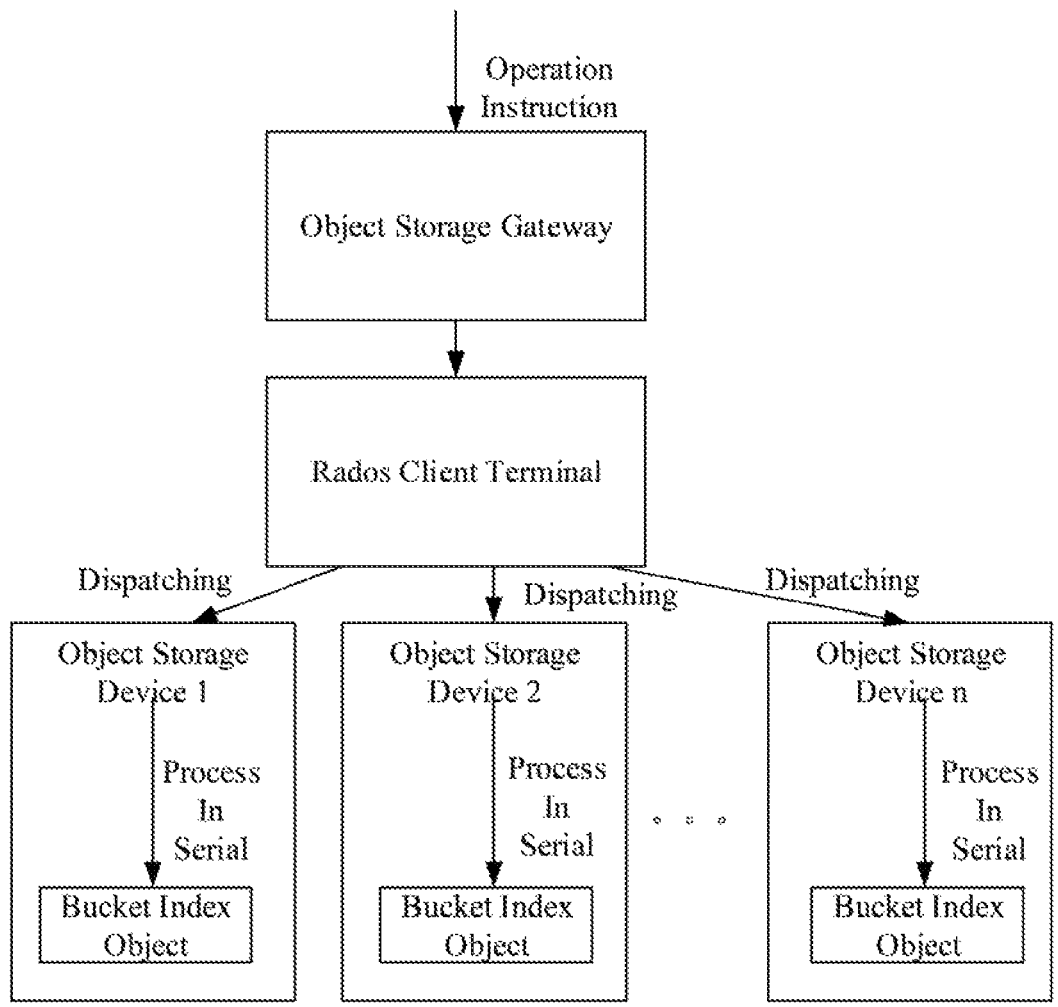
FIG. 1 is an operational schematic diagram of a RadosGW in the existing technologies.
Figure 2:
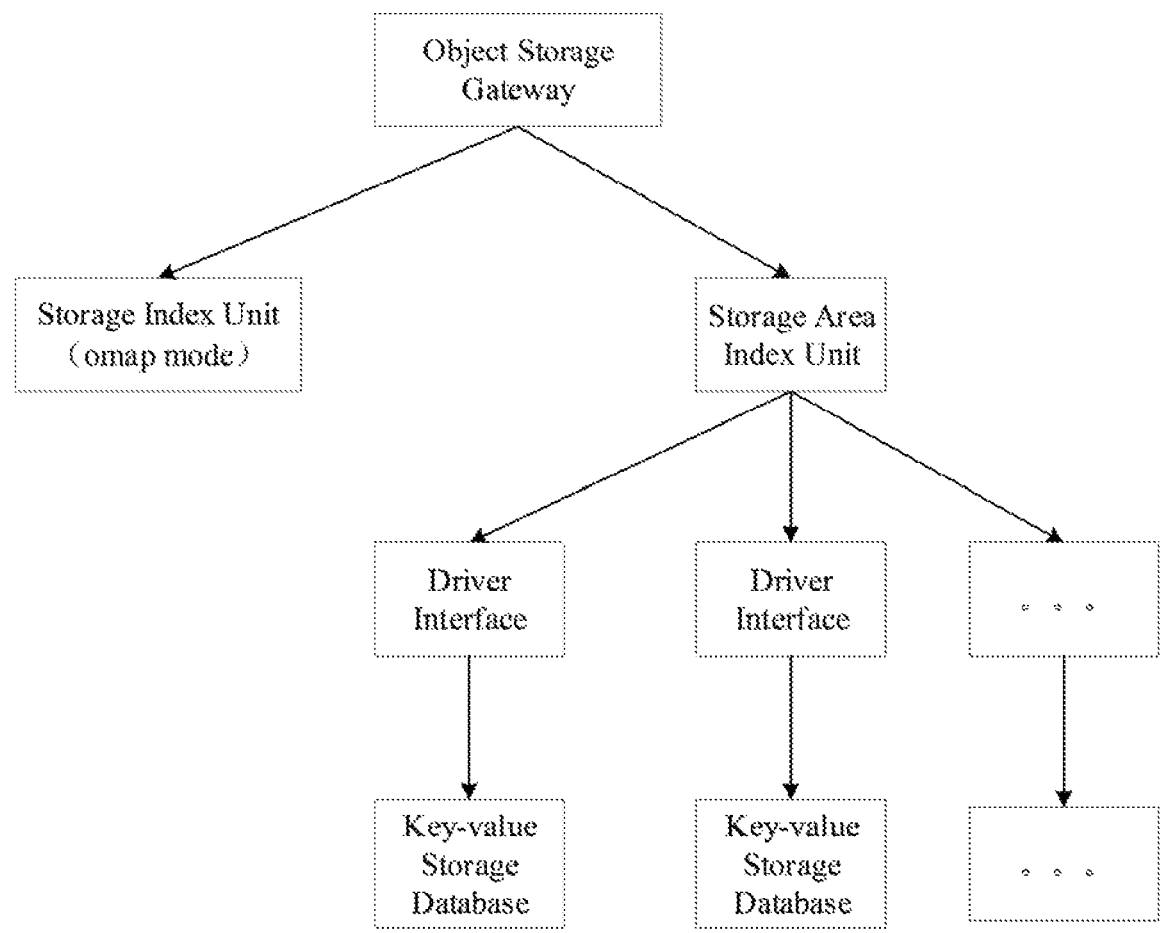
FIG. 2 is a schematic diagram of interaction between an object storage gateway and a key-value storage database according to some embodiments of the present disclosure.

Referring to FIG. 2, the object storage gateway RadosGW provided by the present disclosure may include a bucket index unit based on a key-value storage database mode. The bucket index unit may associate a bucket with a data table in a key-value storage database. Specifically, as shown in FIG. 2, the RadosGW may establish a connection with at least one key-value storage database, which may include, for example, at least one database among MongoDB, RocksDB, etc. A driver interface matching the key-value storage database may be provided in the RadosGW. Through this driver interface, the RadosGW may exchange data with the corresponding key-value storage database.

Apparently, in real applications, the object storage gateway RadosGW may still retain an object mapping (oMap) mode-based storage index unit in the existing Ceph system, where the storage index unit may associate a bucket with a bucket index object according to the existing methods. It should be noted that with the development of technology, an oMap mode-based storage index unit may be removed from the RadosGW. Accordingly, the RadosGW gateway provided by the embodiments of the present disclosure is not limited to the scenarios that include both the oMap mode and the key-value storage database mode, but may include just the key-value storage database mode.

Figure 3:
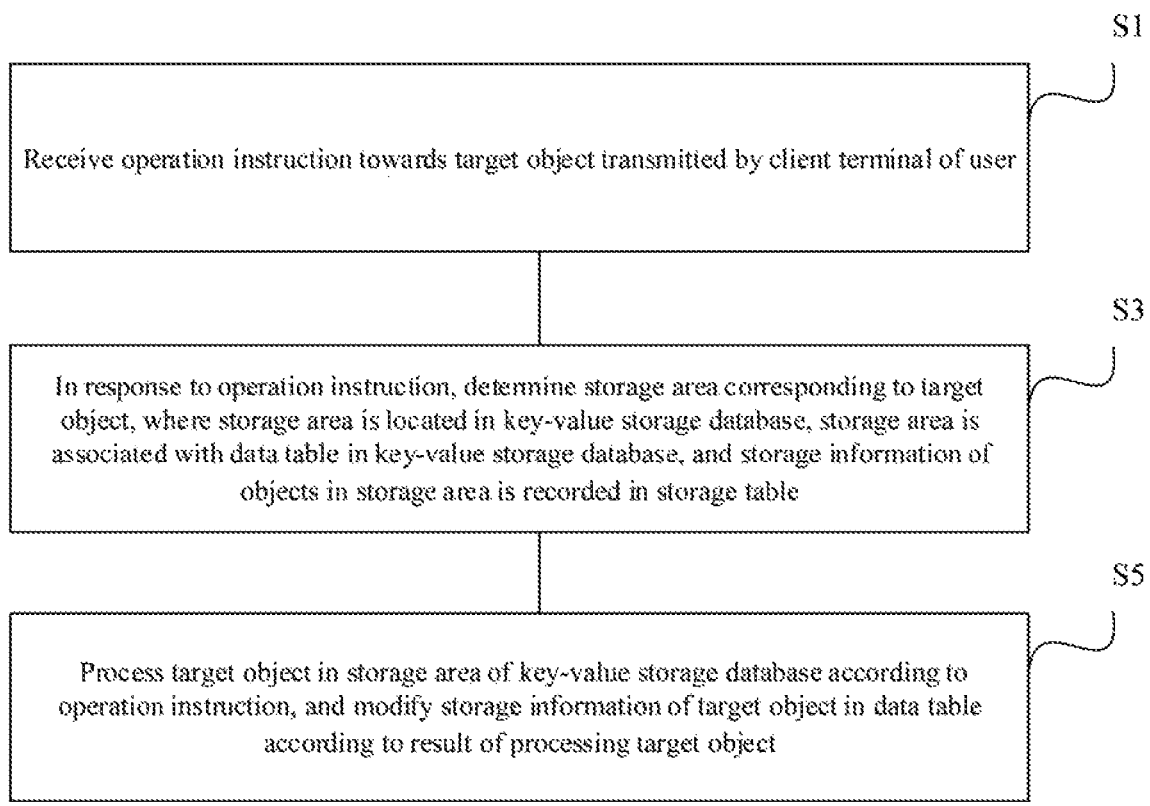
FIG. 3 is a flowchart of a method for object storage according to some embodiments of the present disclosure.

Referring to FIG. 3, the object storage method provided by the present disclosure may include the following steps.

S1: Receive an operation instruction towards a target object transmitted by a client terminal of a user.

In the disclosed implementation, when a user wants to perform an operation against a target object, the user may send, through a client terminal of the user, an operation instruction towards the target object to the Ceph system. The operation instruction may be a read instruction, write instruction, delete instruction, or modify instruction, etc., and the operation instruction may be received by the RadosGW.

S3: In response to the operation instruction, determine a storage area corresponding to the target object, where the storage area is located in the key-value storage database, the storage area is associated with a data table in the key-value storage database, and storage information of objects in the storage area is recorded in the storage table.

In the disclosed implementation, after receiving the operation instruction, the RadosGW may determine the corresponding storage area (bucket) of the target object. Specifically, if the operation instruction is a read, delete, or modify instruction, it means that the target object has already been stored in the key-value storage database. At this moment, the RadosGW may parse the operation instruction to obtain the identifier of the target object. The identifier of the target object may be the name of the target object in the Ceph system. When target objects are stored in the key-value storage database, these objects may be divided according to the storage area, where each storage area may be associated with a data table in the key-value storage database. In the data table, the storage information of each object in the storage area may be recorded. The stored information may be, for example, in the form of a key-value pair, where the key in the stored information may be the name of an object, while the value may be the storage address of the object in the key-value storage database. In this way, after parsing out the identifier of the target object in the operation instruction, the RadosGW may query the data table where the identifier is located. Since the data tables have a one-to-one correspondence with the storage areas, the storage area where the target object is located may be then determined.

It should be noted that the aforementioned data tables in the disclosed implementation may have different forms in different key-value storage databases. For example, in a RocksDB, the data tables may be in the form of a form, while in a MongoDB, the data tables may be in the form of a collection.

In the disclosed implementation, if the operation instruction is a write instruction, it means that the target object is not currently stored in the key-value storage database. At this point, the operation instruction may include the target object itself, or may include the current storage path of the target object. Accordingly, after receiving the write instruction of the target object, the RadosGW may extract the data of the target object from the operation instruction, or load the data of the target object according to the storage path included in the operation instruction. When storing the target object, the RadosGW may determine, by using a crush algorithm or a consistent hashing algorithm, the corresponding storage area of the target object from a large number of storage areas, and subsequently write the target object into the determined storage area.

S5: According to the operation instruction, process the target object in the storage area of the key-value storage database, and modify the storage information of the target object in the data table according to a result of processing the target object.

In the disclosed implementation, after determining the storage area corresponding to the target object, the target object may be processed in the storage area of the key-value storage database according to the content actually represented by the operation instruction. For example, the target object may be written into the storage area, or may be modified in, read from, or deleted from the storage area. After processing the target object, the operation information may be updated to the data table corresponding to the storage area. Specifically, in the storage information of the data table, the operation type and operation time of the most recent operation of the target object may be noted. Then, after completion of the current processing of the target object, the storage information of the target object may be modified according to the operation type used in the current processing and the corresponding operation time, so as to ensure that the storage information in the data table is consistent with the actual target object.

In one implementation, considering that there are two storage modes in the RadosGW: one is the original oMap mode while the other is the improved key-value storage database storage mode. Accordingly, when the RadosGW is started, it is possible to determine which mode should be used for object storage at present. In view of this, in the disclosed implementation, a configuration item for signifying the storage mode may be added to the Ceph system. For example, a configuration item named bucket index type may be added to the zone configuration items of the Ceph system. The configuration item may indicate, based on the currently assigned value, whether the original oMap mode or the key-value storage database storage mode is used. For example, when the configuration item is assigned a value of 0, it indicates that the original oMap mode is currently being used, while when the configuration item is assigned a value of 1, it indicates that the key-value storage database storage mode is currently being used. Accordingly, when the RadosGW is started, the current configuration information in the Ceph system may be read and the configuration item for signifying the storage mode in the configuration information may be identified. When the configuration item indicates that the key-value storage database storage mode is currently used, the RadosGW may determine the storage area corresponding to the target object in response to the operation instruction.

Additionally, the RadosGW may also determine which storage mode should be used based on a volume of data to be processed. Specifically, the data volume of the target object may be included in the operation instruction transmitted by the client terminal. When the data volume is small, the target object may be processed by using either the oMap mode or the key-value storage database mode. However, when the data volume is greater than or equal to a specified data volume threshold, the oMap mode may not be able to effectively process the target object. Under this situation, the RadosGW may automatically select the key-value storage database-based mode to process the target object. Accordingly, the corresponding storage area of the target object may be determined in response to the operation instruction according to the technical scheme described in Step S3. The aforementioned specified data volume threshold may be generalized according to the historical data volumes processed by the oMap-based mode. For example, according to the volumes of a plurality of data processed by the oMap mode, the upper limit of the data volumes that can be processed by the oMap mode may be determined. The upper limit or a certain extra volume added to the upper limit may be then used to obtain the specified data volume threshold.

In some implementation, before issuing the operation instruction, the client terminal may also be used by the user to add an identifier, signifying the selected storage mode, to the operation instruction. The identifier may be, for example, the name of the storage mode selected by the user, or the value for representing the name of the storage mode. In this way, the operation instruction may include the identifier for signifying the selected storage mode. When the RadosGW receives the operation instruction, the identifier included therein may be identified. When the identifier indicates the key-value storage database as the currently selected storage mode, the RadosGW may determine the storage area corresponding to the target object in response to the operation instruction according to the description in Step S3.

In the existing Ceph system, when performing the object storage using the oMap mode, the operation instructions for objects are usually processed in an OSD in serial. This approach undoubtedly has low operation efficiency, resulting in necessarily long waiting time for users. In view of this, in one implementation, in an improved RadosGW, there may exist at least two threads that establish connections with the key-value storage database, where each thread corresponds to a connection with the key-value storage database.

In this way, the at least two threads may respectively execute corresponding operation instructions on the objects in the key-value storage database in parallel, thereby solving the problems of low efficiency and long waiting time of users caused by processing the operation instructions in serial.

In one implementation, the storage information of each object in the data table may be stored independently. When the storage information of a target object appears abnormal in the data table, the RadosGW may fix the storage information of the target object. At this point, because the storage information of each object in the data table is relatively independent, in the process of fixing the storage information of the target object, other storage information in the data table will not be affected, but is still in an accessible state, thereby further improving the stability of the system.

In one implementation, since the key-value storage database storage mode has been improved based on the existing RadosGW, the improved RadosGW may still retain the oMap-based storage index unit, which may store an object in an OSD according to the existing oMap mode. Accordingly, when an object is switched to be stored in the key-value storage database, in order to ensure the data synchronization of the object, it is necessary to also transfer the data of the object in the OSD to the key-value storage database. Specifically, during the data transfer, the object stored in the oMap mode may be read from the object storage device. Since the storage mode of the object is inconsistent with the data format of the key-value storage database, it is necessary to perform a serialization processing on the to-be-read object, to convert the object into data conforming to the format of the key-value storage database. The data after the serialization processing may be then written into the key-value storage database.

In one implementation, when the object storage gateway is started, if the object storage gateway determines to use the key-value storage database storage mode at present, a driver interface matching the key-value storage database may be initialized, so that normal data exchange with the key-value storage database may be maintained through the initialized driver interface.

Embodiment 2

Figure 4:
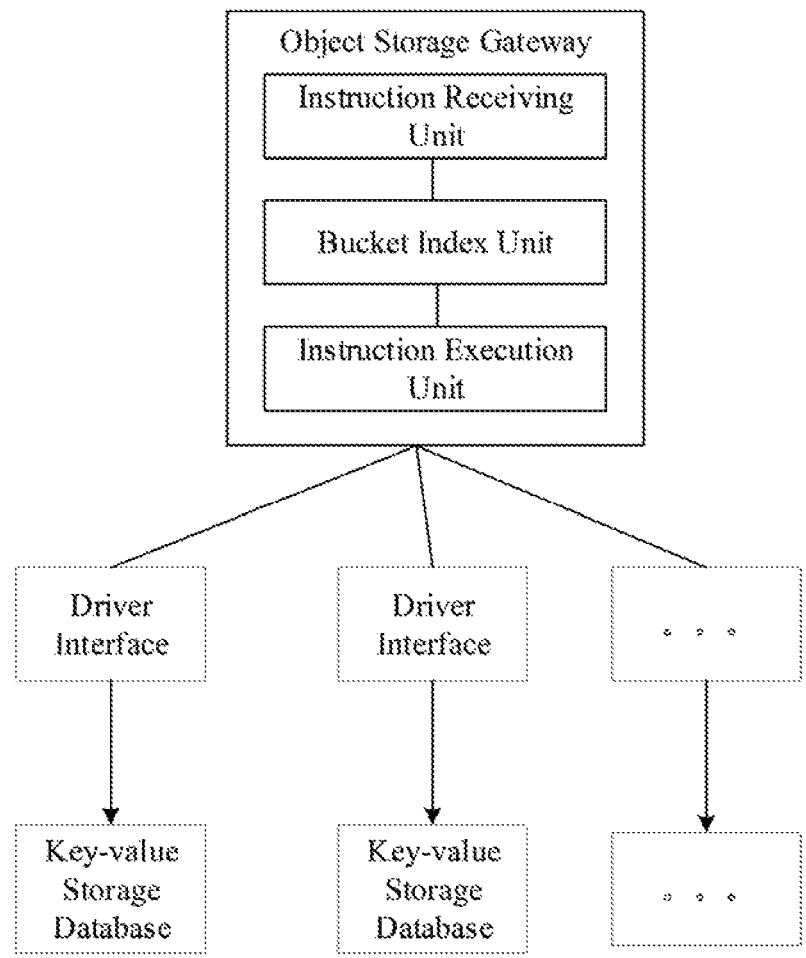
FIG. 4 is a functional block diagram of an object storage gateway according to some embodiments of the present disclosure.

Referring to FIG. 4, the present disclosure further provides an object storage gateway. The object storage gateway establishes a connection with the key-value storage database, and the object storage gateway includes:

an instruction receiving unit that is configured to receive an operation instruction, towards a target object, transmitted by a client terminal of a user;

a bucket index unit that is configured to determine a storage area corresponding to the target object in response to the operation instruction, where the storage area is located in a key-value storage database, the storage area is associated with a data table in the key-value storage database, and storage information of objects in the storage area is recorded in the data table; and an instruction execution unit that is configured to process the target object in the storage area of the key-value storage database according to the operation instruction, and modify storage information of the target object in the data table according to a result of processing the target object.

In one implementation, the object storage gateway further includes:

a configuration information reading unit that is configured to read current configuration information when the object storage gateway is started, and identify a configuration item, for signifying a storage mode, from the configuration information;

correspondingly, when the configuration item indicates the key-value storage database as a currently used storage mode, the bucket index unit determines the storage area corresponding to the target object in response to the operation instruction.

In one implementation, there exist at least two threads in the object storage gateway to establish connections with the key-value storage database, where the at least two threads are configured to respectively execute corresponding operation instructions in parallel on objects in the key-value storage database.

In one implementation, the object storage gateway further includes:

a storage information fixing unit that is configured to fix the storage information of the target object if the storage information of the target object appears abnormal in the data table, where other storage information in the data table is in an accessible state when the storage information of the target object is being fixed.

In one implementation, the object storage gateway further includes an object mapping-based storage index unit, which stores objects in an object storage device according to the object mapping mode;

correspondingly, the object storage gateway further includes:

a data synchronization unit that is configured to read, from the object storage device, an object stored according to the object mapping mode, perform a serialization processing on the read object, and write the data after the serialization processing into the key-value storage database.

In one implementation, the object storage gateway further includes a driver interface matching the key-value storage database; correspondingly, the object storage gateway further includes:

a driver initialization unit that is configured to, after the object storage gateway is started, if the object storage gateway currently uses a key-value storage database storage mode, initialize the driver interface matching the key-value storage database.

In one implementation, the operation instruction includes a data volume of the target object; correspondingly, when the data volume indicated by the operation instruction is greater than or equal to a specified data volume threshold, the bucket index unit determines the storage area corresponding to the target object in response to the operation instruction.

In one implementation, the operation instruction includes an identifier for signifying a selected storage mode; correspondingly, when the identifier indicates the key-value storage database as a currently selected storage mode, the bucket index unit determines the storage area corresponding to the target object in response to the operation instruction.

As can be seen from the above, the technical solutions provided by the present disclosure may improve the existing RadosGW by adding a key-value storage database-based object storage mode in the RadosGW. Specifically, the object storage gateway may establish a connection with the key-value storage database, and index information of all of the users' objects may be stored in the key-value storage database. At the same time, the objects in the key-value storage database may be divided according to the storage area. Each storage area may be associated with a data table in the key-value storage database, where the data table may record the storage information of each object in the storage area. In this way, when the RadosGW receives an operation instruction towards a target object issued by a user, the RadosGW may first determine the storage area corresponding to the target object. Afterwards, through the connection established with the key-value storage database, the RadosGW may process the target object in the corresponding storage area of the key-value storage database. After processing, the storage information of the target object in the data table may be modified according to the result of processing the target object. As can be seen, the technical solutions provided by the present disclosure no longer associate a bucket with a bucket index object, but rather associate a bucket with a data table in the key-value storage database. Due to the relatively better stability of a key-value storage database, the stability of data storage may be thus improved. In addition, when modifying the storage information of an object in the data table, the storage information of other objects may be ascertained to be not affected, thereby further affirming the stability of data storage.

Through the description of the foregoing embodiments, a person skilled in the art may well understand that the various embodiments may be implemented by means of software plus the necessary general hardware platform, or apparently, by means of hardware. In light of this understanding, the above-described technical solutions, or the essential parts that contribute to the existing technologies, may be embodied in the form of software products. The computer software products may be stored in computer-readable storage media, such as ROM/RAM, disks, CD-ROMs, etc., and include a series of instructions for enabling a computer device (such as a personal computer, a server, or a network device) to implement each embodiment or certain portions of methods described in each embodiment.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. An object storage method for application in an object storage gateway, comprising:
   receiving an operation instruction, towards a target object, transmitted by a client terminal of a user;
   in response to the operation instruction, determining a storage area corresponding to the target object, wherein the storage area is located in a key-value storage database, the storage area has a one-to-one correspondence with a data table in the key-value storage database, and storage information of objects in the storage area is recorded in the data table; and
   processing the target object in the storage area of the key-value storage database according to the operation instruction, and modifying storage information of the target object in the data table according to a result of processing the target object;
   wherein there exist at least two threads in the object storage gateway to establish connections with the key-value storage database, and the at least two threads are configured to respectively execute corresponding operation instructions in parallel on objects in the key-value storage database.

2. The method according to claim 1, further comprising:
   when the object storage gateway is started, reading, by the object storage gateway, current configuration information and identifying a configuration item, for signifying a storage mode, from the configuration information; and when the configuration item indicates the key-value storage database as a currently used storage mode, determining the storage area corresponding to the target object in response to the operation instruction.

3. The method according to claim 1, further comprising:
if the storage information of the target object appears abnormal in the data table, fixing the storage information of the target object, wherein other storage information in the data table is in an accessible state when the storage information of the target object is being fixed.

4. The method according to claim 1, wherein the operation instruction includes a data volume of the target object, and when the data volume indicated by the operation instruction is greater than or equal to a specified data volume threshold, determining the storage area corresponding to the target object in response to the operation instruction.

5. The method according to claim 1, wherein the operation instruction includes an identifier for signifying a selected storage mode; and when the identifier indicates the key-value storage database as a currently selected storage mode, determining the storage area corresponding to the target object in response to the operation instruction.

6. The method according to claim 1, wherein the object storage gateway further includes a driver interface matching the key-value storage database, and the method further includes:

after the object storage gateway is started, if the object storage gateway currently uses a key-value storage database storage mode, initializing the driver interface matching the key-value storage database.

7. The method according to claim 1, wherein, in response to the operation instruction, determining a storage area corresponding to the target object comprising:

when the target object has already been stored in the key-value storage database, parsing the operation instruction to obtain an identifier of the target object;
querying the data table where the identifier of the target object is located and determining a storage area corresponding to the data table as the storage area corresponding to the target object; wherein the storage information of objects include identifiers of objects.

8. The method according to claim 1, wherein, in response to the operation instruction, determining a storage area corresponding to the target object comprising:

when the target object is not currently stored in the key-value storage database, determining, by using a crush algorithm or a consistent hashing algorithm, the storage area corresponding to the target object.

9. The method according to claim 1, wherein, processing the target object in the storage area of the key-value storage database according to the operation instruction comprising:

extracting data of the target object from the operation instruction, or loading the data of the target object according to storage path of the target object included in the operation instruction;
writing the data of the target object into the determined storage area corresponding to the target object.

10. The method according to claim 1, wherein, the object storage gateway retains an object mapping mode-based storage index unit in existing Ceph system, establishes a connection with an object mapping mode-based storage index unit, and associates a bucket with a bucket index object.

11. An object storage gateway, the object storage gateway establishing a connection with a key-value storage database, and the object storage gateway comprising:

an instruction receiving unit that is configured to receive an operation instruction, towards a target object, transmitted by a client terminal of a user;
a bucket index unit that is configured to determine a storage area corresponding to the target object in response to the operation instruction, wherein the storage area is located in a key-value storage database, the storage area has a one-to-one correspondence with a data table in the key-value storage database, and storage information of objects in the storage area is recorded in the data table; and
an instruction execution unit that is configured to process the target object in the storage area of the key-value storage database according to the operation instruction, and modify storage information of the target object in the data table according to a result of processing the target object;
wherein there exist at least two threads in the object storage gateway to establish connections with the key-value storage database, and the at least two threads are configured to respectively execute corresponding operation instructions in parallel on objects in the key-value storage database.

12. The object storage gateway according to claim 11, further comprising:

a configuration information reading unit that is configured to read current configuration information when the object storage gateway is started, and identify a configuration item, for signifying a storage mode, in the configuration information; and
the bucket index unit is further configured to determine the storage area corresponding to the target object in response to the operation instruction when the configuration item indicates the key-value storage database as a currently used storage mode.

13. The object storage gateway according to claim 11, further comprising:

a storage information fixing unit that is configured to fix the storage information of the target object if the storage information of the target object appears abnormal in the data table, wherein other storage information in the data table is in an accessible state when the storage information of the target object is being fixed.

14. The object storage gateway according to claim 11, wherein the object storage gateway further includes a driver interface matching the key-value storage database; and the object storage gateway further includes:

a driver initialization unit that is configured to, after the object storage gateway is started, if the object storage gateway currently uses a key-value storage database storage mode, initialize the driver interface matching the key-value storage database.

15. The object storage gateway according to claim 11, wherein the operation instruction includes a data volume of the target object, and the bucket index unit is further configured to, when the data volume indicated by the operation instruction is greater than or equal to a specified data volume threshold, determine the storage area corresponding to the target object in response to the operation instruction.

16. The object storage gateway according to claim 11, wherein the operation instruction includes an identifier for signifying a selected storage mode; and the bucket index unit is further configured to determine the storage area corresponding to the target object in response to the operation instruction when the identifier indicates the key-value storage database as a currently selected storage mode.

\* \* \* \* \*